United States Patent [19]

Michaelis

[11] Patent Number: 4,849,466
[45] Date of Patent: Jul. 18, 1989

[54] STABILIZED CHLORINE-CONTAINING POLYMERS

[75] Inventor: Klaus-Peter Michaelis, Lindenfels/Odenwald, Fed. Rep. of Germany

[73] Assignee: Ciba-Geigy Corporation, Ardsley, N.Y.

[21] Appl. No.: 86,336

[22] Filed: Aug. 17, 1987

[30] Foreign Application Priority Data

Aug. 29, 1986 [CH] Switzerland ............ 3481/86

[51] Int. Cl.⁴ .................... C08K 5/34; C08K 5/58
[52] U.S. Cl. ............................ 524/105; 524/106; 524/108; 524/110; 524/180; 524/282; 524/283; 524/415; 524/421; 524/426; 524/427
[58] Field of Search ............. 524/105, 106, 180, 108, 524/110, 282, 283, 415, 421, 426, 427

[56] References Cited

U.S. PATENT DOCUMENTS

| | | | |
|---|---|---|---|
| 3,873,477 | 3/1975 | Beck et al. | 524/105 |
| 4,160,762 | 7/1979 | Minagawa et al. | 524/180 |
| 4,196,110 | 4/1980 | Abeler et al. | 524/105 |
| 4,219,605 | 8/1980 | Rohringer | 524/180 |
| 4,374,945 | 2/1983 | Liauw et al. | 524/180 |
| 4,546,136 | 10/1985 | Cooray | 524/180 |
| 4,611,012 | 9/1986 | Muller | 524/180 |
| 4,617,334 | 10/1986 | Kugele et al. | 524/180 |
| 4,619,957 | 10/1986 | Reid et al. | 524/180 |
| 4,681,907 | 7/1987 | Mesch et al. | 524/180 |

FOREIGN PATENT DOCUMENTS

| | | | |
|---|---|---|---|
| 1134197 | 2/1963 | Fed. Rep. of Germany . | |
| 34453 | 11/1970 | Japan | 524/180 |
| 59745 | 3/1978 | Japan | 524/180 |

OTHER PUBLICATIONS

Plastics Additives Handbook, (1987), pp. 204–219.
G. Schroeter, Chem. Ber. 42, 2236, (1909).

*Primary Examiner*—John Kight
*Assistant Examiner*—Kriellion Morgan
*Attorney, Agent, or Firm*—Harry Falber; Stephen V. O'Brien

[57] ABSTRACT

Chlorine-containing polymer containing (a) at least one compound of the formula I

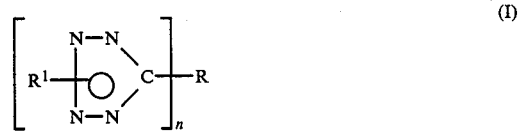

in which $R^1$ is hydrogen, $C_1$–$C_4$-alkyl, $C_5$–$C_6$-cycloalkyl, phenyl or phenyl which is substituted by $C_1$–$C_4$-alkyl or halogen, n is 1 or 2 and, if n is 1, R is $C_1$–$C_{20}$-alkyl, $C_1$–$C_{20}$-alkyl which is substituted by —OH or —SH, $C_2$–$C_{20}$-alkyl which is interrupted by

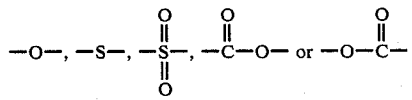

phenyl, phenyl which is substituted by $C_1$–$C_4$-alkyl, benzyl, benzyl which is substituted by $C_1$–$C_4$-alkyl, $C_5$–$C_6$-cycloalkyl or —$NR^2R^3$ in which $R^2$ and $R^3$ are identical or different and are as defined for $R^1$, and, if n is 2, R is a direct bond, $C_1$–$C_{10}$-alkylene, $C_1$–$C_{10}$-alkylene which is substituted by phenyl, benzyl, —OH, $C_1$–$C_4$-alkoxy, $C_1$–$C_{20}$-acyloxy, phenylsulfonyl or $C_1$–$C_4$-alkylsulfonyl or $C_2$–$C_{10}$-alkylene which is interrupted by

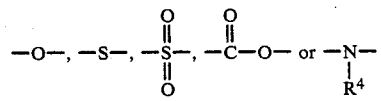

in which $R^4$ is hydrogen, $C_1$–$C_4$-alkyl, phenyl, benzyl, naphthyl, cyclohexyl or $C_1$–$C_{20}$-acyl, or R is also $C_2$–$C_{10}$-alkylidene, phenylene, benzylene or xylylene, and (b) at least one organotin compound and/or lead compound and/or organic antimony compound.

13 Claims, No Drawings

STABILIZED CHLORINE-CONTAINING POLYMERS

The present invention relates to a chlorine-containing polymer which has been stabilized against the harmful effects of light and/or heat and contains (a) at least one tetrazole and (b) at least one organotin compound and/or lead compound and/or organic antimony compound, and to the use of a mixture of the components (a) and (b) mentioned, for stabilizing a chlorine-containing polymer.

It is known that chlorine-containing polymers have to be protected against the harmful effects of light and/or heat, particularly when being processed to give shaped articles. A polyvinyl chloride stabilized by means of a tetrazole and a mixture of Ca/Zn stearate is known from U.S. Pat. No. 4,196,110. The use of tetrazoles and their salts for stabilizing chlorine-containing polymers and copolymers is described in German Patent Specification 1,134,197.

The present invention relates to a chlorine-containing polymer containing (a) at least one compound of the formula I

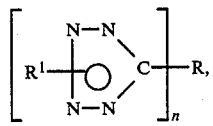

in which $R^1$ is hydrogen, $C_1$–$C_4$-alkyl, $C_5$–$C_5$-cycloalkyl, phenyl or phenyl which is substituted by $C_1$–$C_4$-alkyl or halogen, n is 1 or 2, and if n is 1, R is $C_1$–$C_{20}$-alkyl, $C_1$–$C_{20}$-alkyl which is substituted by —OH or —SH, $C_2$–$C_{20}$-alkyl which is interrupted by

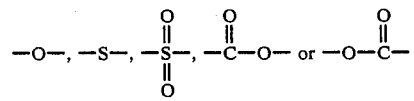

phenyl, phenyl which is substituted by $C_1$–$C_4$-alkyl, benzyl, benzyl which is substituted by $C_1$–$C_4$-alkyl, $C_5$–$C_6$-cycloalkyl or —$NR^2R^3$ in which $R^2$ and $R^3$ are identical or different and are as defined for $R^1$, and, if n is 2, R is a direct bond, $C_1$–$C_{10}$-alkylene, $C_1$–$C_{10}$-alkylene which is substituted by phenyl, benzyl, —OH, $C_1$–$C_4$-alkoxy, $C_1$–$C_{20}$-acyloxy, phenylsulfonyl or $C_1$–$C_4$-alkylsulfonyl, or $C_2$–$C_{10}$-alkylene which is interrupted by

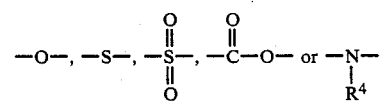

in which $R^4$ is hydrogen, $C_1$–$C_4$-alkyl, phenyl, benzyl, naphthyl, cyclohexyl or $C_1$–$C_{20}$-acyl, or R is also $C_2$–$C_{10}$-alkylidene, phenylene, benzylene or xylylene, and (b) at least one organotin compound and/or lead compound and/or organic antimony compound.

Surprisingly, the combination of a tetrazole and at least one organotin compound and/or lead compound and/or organic antimony compound has a favourable effect on the colour stability of chlorine-containing polymers when processed by thermoplastic methods, but particularly when articles produced therefrom are subjected to weathering.

Examples of $R^1$, $R^2$, $R^3$ and $R^4$ as $C_1$–$C_4$-alkyl are methyl, ethyl, propyl, isopropyl, n-butyl, isobutyl or tert-butyl.

Examples of R, $R^1$, $R^2$ and $R^3$ as $C_5$–$C_6$-cycloalkyl are cyclopentyl or cyclohexyl.

Examples of $R^1$, $R^2$ and $R^3$ as phenyl which is substituted by $C_1$–$C_4$-alkyl or halogen are tolyl, xylyl or 3-chlorophenyl.

As $C_1$–$C_{20}$-alkyl, R can, for example, be as defined above for $R^1$ as $C_1$–$C_4$-alkyl and additionally can also be pentyl, hexyl, 2-ethylhexyl, octyl, dodecyl, hexadecyl, octadecyl or eicosyl. $C_1$–$C_8$-alkyl is preferred and $C_1$–$C_6$-alkyl is particularly preferred.

The following are examples of R as $C_2$–$C_{20}$-alkyl which is interrupted by

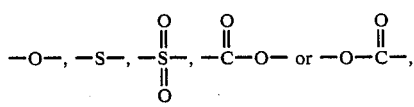

or as $C_1$–$C_{20}$-alkyl which is substituted by —OH or —SH: methoxyethyl, ethoxymethyl, propoxypropyl, butoxyethyl, octoxyethyl, octadecyloxyethyl, methylthiaethyl, hexylthiaethyl, propylsulfonylethyl, methoxycarbonylmethyl, dodecanoyloxyethyl, ethylcarbonyloxyethyl, hydroxyethyl, hydroxybutyl or mercaptoethyl. $C_2$–$C_{12}$-alkoxyalkyl, $C_2$–$C_{12}$-alkylthiaalkyl and $C_2$–$C_{12}$-hydroxyalkyl are preferred.

Examples of R as phenyl which is substituted by $C_1$–$C_4$-alkyl are tolyl or xylyl.

Examples of R as benzyl which is substituted by $C_1$–$C_4$-alkyl are methylbenzyl, dimethylbenzyl or butylbenzyl.

Examples of R as $C_1$–$C_{10}$-alkylene are methylene, ethylene, 1,2-propylene, 1,3-propylene, 1,2-, 1,3- or 1,4-butylene, 1,5-pentylen, 1,1-dimethylpropylene, 2,2-dimethylpropylene, 1,5-hexylene, 1,4-heptylene, 1,2-octylene, 1,6-octylene, 1,2-decylene or 1,10-decylene. $C_1$–$C_8$-alkylene is preferred and $C_1$–$C_6$-alkylene is particularly preferred.

The following examples of R as $C_1$–$C_{10}$-alkylene which is substituted by phenyl, benzyl, —OH, $C_1$–$C_4$-alkoxy, $C_1$–$C_{20}$ acyloxy, phenylsulfonyl or $C_1$–$C$-*alkylsulfonyl*, or as $C_2$–$C_{10}$-alkylene which is interrupted by

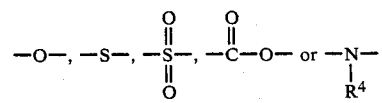

are: 2-phenyl-1,3-propylene, 1,2-diphenylethylene, benzylidene, diphenylmethylidene, 2-hydroxy-1,3-propylene, 3-formyloxypentylene, 2-propionyloxy-1,3-propylene, 2-octadecanoyloxy-1,3-propylene, 2-methoxy-1,3-propylene or a radical of the formula —$C_mH_{2m}$—X—$C_m$—$H_{2m}$— in which X is, for example,

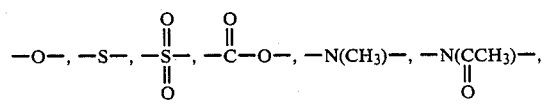

-continued

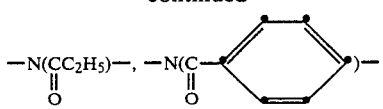

and m is an integer from 1 to 5.

If R, as $C_1$–$C_{10}$-alkylene, is substituted by the group $C_1$–$C_{20}$-acyloxy, $C_1$–$C_{20}$-acyloxy is preferably $C_1$–$C_{18}$-alkanoyloxy (for example formyloxy, acetoxy, propionyloxy or octadecanoyloxy), $C_3$–$C_{10}$-alkenoyloxy (for example acryloyloxy or crotonoyloxy), benzoyloxy and, particular preferably, $C_1$–$C_{10}$-alkanoyloxy.

Examples of R as $C_2$–$C_{10}$-alkylidene are ethylidene, prop-2-ylidene, but-2-ylidene, pent-3-ylidene, hex-3-ylidene or dec-5-ylidene. $C_2$–$C_8$-alkylidene is preferred.

As $C_1$–$C_{20}$-acyl, $R^4$ is preferably benzoyl, $C_1$–$C_{10}$-alkanoyl (for example formyl, acetyl, propionyl or pentanoyl) or is $C_3$–$C_{10}$-alkenoyl (for example acryloyl or methacryloyl). $C_1$–$C_{10}$-alkanoyl is particularly preferred.

The following are preferred examples of compounds of the formula I:

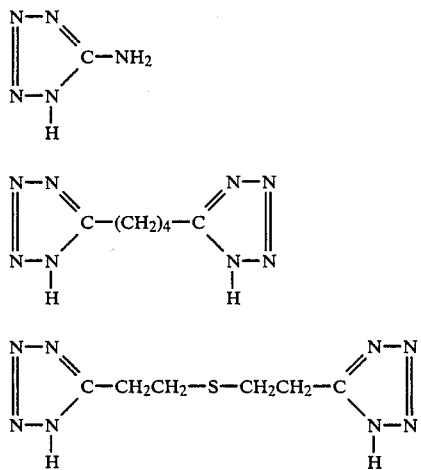

The following are examples of organotin compounds:

(I) Organotin mercaptides, particularly those of the formulae IIa and IIb

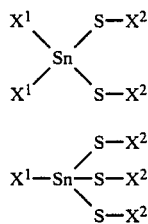

in which $X^1$ is $C_6$–$C_{20}$-alkoxycarbonylalkyl or $C_1$–$C_{20}$-alkyl, preferably $C_1$–$C_{12}$-alkyl and particularly preferably methyl, n-butyl, n-octyl or n-dodecyl, and $X^2$ is $C_6$–$C_{20}$-alkoxycarbonylalkyl, $C_6$–$C_{20}$-alkylcarbonyloxyalkyl or $C_4$–$C_{18}$-alkyl, in particular isooctyl.

Examples of $X^1$ and $X^2$ as $C_6$–$C_{20}$-alkoxycarbonylalkyl are ($C_4$–$C_{17}$-alkyl)—O—CO—CH$_2$CH$_2$— or ($C_4$–$C_{18}$-alkyl)—O—CO—CH$_2$—, for example hexoxycarbonylethyl, isooctoxycarbonylmethyl, isooctoxycarbonylethyl or dodecyloxycarbonylethyl. Isooctoxycarbonylethyl is preferred.

As $C_6$–$C_{20}$-alkylcarbonyloxyalkyl, $X^2$ is, for example, ($C_4$–$C_{17}$-alkyl)—CO—O—CH$_2$CH$_2$—, in particular isooctylcarbonyloxyethyl.

The following are preferred: methyltin tris-[alkyl thioglycollate], n-butyltin tris-[alkyl thioglycollate], n-butyoxycarbonylethyltin tris-[alkyl thioglycollate], dimethyltin bis-[alkyl thioglycollate], di-n-butyltin bis-[alkyl thioglycollate], bis-[n-butoxycarbonylethyl]tin-bis-[alkyl thioglycollate], methyltin tris-[alkyl thiopropionate] n-butyltin tris-[alkyl thiopropionate], n-butoxycarbonylethyltin tris-[alkyl thiopropionate], dimethyltin bis-[alkyl thiopropionate], di-n-butyltin bis-[alkyl thiopropionate] and bis-[n-butoxycarbonylethyl]-tin bis-[alkyl thiopropionate], alkyl being, for example, isooctyl (2-ethylhexyl), dodecyl, tridecyl or tetradecyl. Di-n-butyltin bis-[isooctyl thioglycollate], n-butyltin tris-[n-tetradecyl thioglycollate], di-n-octyltin bis-[isooctyl thioglycollate] and n-octyltin tris-[isooctyl thioglycollate] are particularly preferred.

The compounds of the formula IIc

in which $X^3$ is $C_1$–$C_{20}$-alkyl may also be mentioned as organotin mercaptides.

(II) Organotin sulfides, such as di-[$C_1$–$C_{18}$-alkyl]-tin sulfides or $C_1$–$C_{18}$-alkyl thiostannonic acids, in particular the cyclic di-n-butyltin sulfide of the formula IId and the adamantane-like n-butyl thiostannonic acid of the formula IIe.

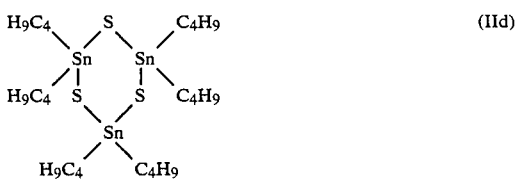

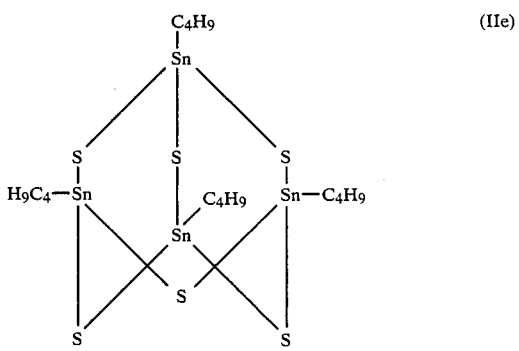

(III) Organotin carboxylates, in particular those of the formula IIf

in which $X^4$ and $X^5$ are $C_1$–$C_{20}$-alkyl and $X^5$ is additionally ($C_1$–$C_{20}$-alkyl)—C—CO—CH=CH—.

$X^4$ and $X^5$ are preferably $C_1$–$C_{10}$-alkyl. $X^4$ is particularly preferably n-butyl or n-octyl.

The compound di-n-butyltin bis-[methylmaleate] is of interest.

The compounds of the formula IIg

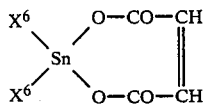

in which $X^6$ is $C_1$–$C_{20}$-alkyl may also be mentioned as organotin carboxylates.

The following are examples of lead compounds:
Tribasic lead sulfate: 3 PbO.PbSO$_4$.H$_2$O
Dibasic lead phosphite: 2 PbO.PbHPO$_3$.½H$_2$O
Dibasic lead pthalate: 2 PbO.Pb(OOC)$_2$C$_6$H$_4$
Dibasic lead stearate: 2 PbO.Pb(OOCC$_{17}$H$_{35}$)$_2$
Neutral lead stearate: Pb(OOCC$_{17}$H$_{35}$)$_2$
Dibasic lead carbonate: 2PbO.PbCO$_3$ The following are examples of organic antimony compounds:

Antimony mercaptides, especially compounds of the formula IIh

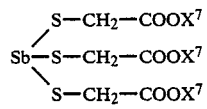

in which $X^7$ is $C_4$–$C_{18}$-alkyl, preferably isooctyl.

In the preceeding expositions, the term $C_1$–$C_{20}$-alkyl is, for example, methyl, ethyl, propyl, isopropyl, n-butyl, isobutyl, tert-butyl, pentyl, hexyl, octyl, dodecyl, hexadecyl, octadecyl or eicosyl.

A chlorine-containing polymer which is of interest is one which contains (a) at least one compound of formula I in which, in the event that n=1, R is $C_1$–$C_{12}$-alkyl, $C_2$–$C_{12}$-alkyl which is interrupted by —O—, —S— or

or $C_1$–$C_{12}$-alkyl which is substituted by —OH or —SH, phenyl, benzyl or —NR$^2$R$^3$ in which R$^2$ and R$^3$ independently of one another are hydrogen or $C_1$–$C_4$-alkyl, and, in the event that n=2, R is $C_1$–$C_6$-alkylene, $C_2$–$C_6$-alkylene which is interrupted by —O—, —S— or —N(R$^4$)—, or $C_1$–$C_6$-alkylene which is substituted by —OH, phenylene, benzylene or xylylene and (b) at least one organotin compound and/or lead compound and/or organic antimony compound.

A chlorine-containing polymer which is of particular interest is one which contains (a) at least one compound of the formula I in which R$^1$ is hydrogen, $C_1$–$C_4$-alkyl or phenyl, preferably hydrogen, and (b) at least one organotin compound and/or lead compound and/or organic antimony compound.

A preferred chlorine-containing polymer is one which contains (a) at least one compound of the formula I in which n is 1 and R is $C_1$–$C_6$-alkyl or $C_1$–$C_6$-alkyl which is substituted by —OH or is —NR$^2$R$^3$ in which R$^2$ and R$^3$ independently of one another are hydrogen or $C_1$–$C_4$-alkyl, and (b) at least one organotin compound and/or lead compound and/or organic antimony compound.

If n is 1, R is preferably —NH$_2$.

n is 2 in compounds of the formula I which are employed preferentially.

A particularly preferred chlorine-containing polymer is one which contains (a) at least one compound of the formula I in which n is 2 and R is $C_1$–$C_6$-alkylene, $C_2$–$C_6$-alkylene which is interrupted by —S—, —O— or phenylimino, or $C_1$–$C_6$-alkylene which is substituted by —OH, especially $C_1$–$C_6$-alkylene or $C_2$–$C_6$-alkylene which is interrupted by —S—, and (b) at least one organotin compound and/or lead compound and/or organic antimony compound.

A chlorine-containing polymer which is also preferred is one which contains (a) at least one compound of the formula I and (b) at least one organotin compound and/or lead compound.

A chlorine-containing polymer which is of particular interest is one which contains (a) at least one compound of the formula I and (b) at least one organotin compound.

The invention also relates to the use of a mixture containing (a) at least one compound of the formula I and (b) at least one organotin compound and/or lead compound and/or organic antimony compound of stabilizing a chlorine-containing polymer against the harmful effects of light and/or heat.

The chlorine-containing polymers are preferably vinyl chloride homopolymers or copolymers. Suspension polymers and bulk polymers and emulsion polymers are also preferred. The following are examples of suitable comonomers for the copolymers: vinyl acetate, vinylidene chloride, transdichloroethylene, ethylene, propylene, butylene, maleic acid, acrylic acid, fumaric acid and itaconic acid. Other suitable chlorine-containing polymers are chlorinated PVC and chlorinated polyolefines, and also graft polymers of PVC with EVA, ABS and MBS. Polyvinyl chloride is particularly preferred as the chlorine-containing polymer.

The ratio of (a) tetrazole to (b) organotin compound and/or lead compound and/or organic antimony compound is advantageously 1:4 to 2:1, especially 1:2 to 2:1.

The concentration for use of the stabilizer mixture consisting of the component (a) and the component (b) is, for example, between 0.5 and 10, preferably 1 and 5, % by weight, relative to the chlorine-containing polymer to be stabilized.

The chlorine-containing polymers can also contain customary amounts of further conventional PVC stabilizers, for example epoxy compounds, preferably epoxidised fatty acid esters, such as epoxidised soya bean oil, or phenolic anti-oxidants or phosphites, for example trioctyl, tridecyl, tridodecyl, tritetradecyl, tristearyl, trioleyl, triphenyl, tricresyl, tris-[p-nonylphenyl] or tricyclohexyl phosphite and particularly preferably aryldialkyl phosphites and alkyldiaryl phosphites, for example phenyldidecyl, nonylphenyldidecyl, (2,4-ditert.-butylphenyl)-didodecyl or (2,6-ditert.-butylphenyl)-didodecyl phosphite, and/or Me(II) carboxylates and/or Me(II) phenates or alkylphenates, especially nonylphenates, Me(II) being Ba, Ca, Cd, Mg or Zn and carboxylate being the anion of a carboxylic acid having 7 to 20 C atoms. The following may be mentioned as examples of carboxylates: stearates, oleates, laurates, palmitates, benzoates, behenates, hydroxystearates or 2-ethylhexanoates.

The tetrazoles of the formula I can also preferably be employed together with a mixture of Ba/Cd/Pb compounds, and the individual components of this mixture can be as defined above.

Depending on the end use of the polymers, it is also possible to use further additives before or during the incorporation of the stabilizers, for example lubricants (preferably montan waxes or glycerol esters), modifiers (impact-modifying additives), pigments, light stabilizers (UV absorbers), fire retarding agents, antistatic agents, fillers (carbon black, asbestos, kaolin, talc or glass fibres), fluorescent brighteners, fatty acid esters, parafins or plasticisers.

The compounds of the formula I are known (in some cases commercially available) or can be prepared analogously to known processes, for example as described in U.S. Pat. No. 4,196,110 and in the event that $R=-NR^2R^3$, in Chem. Ber. 42, 2336 (1909).

The following examples illustrate the invention further. All quantity data are by weight, unless stated otherwise.

The following abbreviations are used in Examples 1–13:

Tetrazole 1:

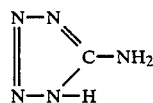

Tetrazole 2:

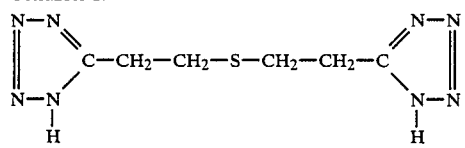

A: Mixture in the ratio of 1:2.5 of n-butyltin tris-[isooctyl thioglycollate] and di-n-butyltin bis-[isooctyl thioglycollate].

B: Mixture in the ratio of 3:1 of n-butyltin tris-[n-tetradecyl thioglycollate] and di-n-butyltin bis-[n-tetradecyl thioglycollate].

C: Mixture in the ratio of 60:1 of di-n-butyltin bis-[methylmaleate] and n-butyltin tris-[methylmaleate].

D: Basic lead compound ( ®Naftovin T 90)

EXAMPLES 1–2

Heat stability (transparent use)

68 g of the formulation indicated below are processed in a Brabender plastograph at 40 revolutions per minute and at a kneader temperature of 180° C. Every 5 minutes a sample of approx. 1 g is taken and compression moulded to give a sheet 1 mm thick. The "Yellowness Index" (YI) of the test sample is determined as specified in ASTM D 1925-70. The results are listed in Table 1.

| Formulation: | |
| --- | --- |
| Polyvinyl chloride ( ®Dalvin 1467) | 100 parts |
| ®Paraloid KM 334 B | 7.0 parts |
| ®Paraloid K 120 N | 1.5 parts |
| ®Irgawax 367 (lubricant) | 0.8 parts |

Stabilizer system as shown in Table 1
(® Paraloid KM 334 B and ® Paraloid K 120 N are conventional processing aids for polyvinyl chloride)

TABLE 1

| | | YI after exposure to heat for a period of minutes | | | |
| --- | --- | --- | --- | --- | --- |
| Example | Stabilizer system | 5 | 10 | 15 | 20 |
| 1 | 1 part of A 0.5 parts of tetrazole 2 | 24.5 | 57.1 | 105 | 136 |
| 2 | 1 part of B 0.5 parts of tetrazole 2 | 19.3 | 44.3 | 85.4 | 105 |

EXAMPLES 3–4:

Heat stability (transparent use).

100 g of the formulation indicated below are placed on mixing rolls preheated to 180° C. After a rough sheet has been formed, samples of the rough sheet exactly 0.3 mm thick are taken at intervals of 5 minutes and the "Yellowness Index" of these is determined as specified in ASTM D 1925-70.

The results are listed in Table 2.

| Formulation: | |
| --- | --- |
| Polyvinyl chloride ( ®Dalvin 1467) | 100 parts |
| ®Paraloid KM 334 B | 7.0 parts |
| ®Paraloid K 120 N | 1.5 parts |
| ®Irgawax 367 (lubricant) | 0.8 parts |

Stabilizer system is as shown in Table 2.

TABLE 2

| Ex. | Stabilizer system | YI after exposure to heat for a period of minutes | | | | | | | | | | | | | |
| --- | --- | --- | --- | --- | --- | --- | --- | --- | --- | --- | --- | --- | --- | --- | --- |
| | | 5 | 10 | 15 | 20 | 25 | 30 | 35 | 40 | 45 | 50 | 55 | 60 | 65 | 70 |
| 3 | 1 part of B 0.5 parts of tetrazole 2 | 10.7 | 13.4 | 17.8 | 22.8 | 27.1 | 31.8 | 34.2 | 40.7 | 47.7 | 53.8 | 54.0 | 60.8 | 72.6 | 91.4 |
| 4 | 1 part of C 0.5 parts of tetrazole 2 | 15.7 | 25.6 | 35.6 | 47.2 | 58.8 | 69.8 | 78.8 | 88.9 | | | | | | |

EXAMPLES 5–8

Light stability 100 g of a dry mixture consisting of the formulation indicated below are milled on mixing rolls for 5 minutes at 190° C. The rough sheet formed is used to prepare, in a hydraulic press at 180° C. and 200 bar, in the course of one minute, sheets 0.5 mm thick.

These sheets are radiated with light of wavelength >290 nm. The degree of colour change produced by the radiation is determined as specified in ASTM D 1925-70 as the colour difference ($\Delta E$) or as the "Yellowness Index" (YI).

The results are listed in Tables 3a and b.

| Formulation: | |
|---|---|
| Polyvinyl chloride of improved impact strength (polyblend with ethylene/vinyl acetate) | 100 parts |

Stabilizer system as shown in Tables 3a and b.

TABLE 3a

| Example | Stabilizer system | YI before exposure | YI after exposure for 168 hours |
|---|---|---|---|
| 5 | 1 part of A 0.5 parts of tetrazole 1 | 22 | 29 |
| 6 | 1 part of dioctyltin maleate 0.5 parts of tetrazole 1 | 59 | 54 |
| 7 | 1 part of antimony tris-[thioglycollate] 0.5 parts of tetrazole 1 | 26 | 54 |

TABLE 3b

| Example | Stabilizer system | ΔE before exposure | ΔE after exposure for 168 hours |
|---|---|---|---|
| 8 | 2 parts of D 0.5 parts of tetrazole 1 | 16 | 19 |

EXAMPLES 9–13:

Light stability

The samples are prepared and tested analogously to Examples 5–8. The results are listed in Tables 4a, 4b and 5.

(I) Transparent use

| Formulation: | |
|---|---|
| Polyvinyl chloride of improved impact strength (polyblend with ethylene/vinyl acetate) | 100 parts |

Stabilizer system as shown in Tables 4a and b

TABLE 4a

| Example | Stabilizer system | YI before exposure | YI after exposure for 168 hours |
|---|---|---|---|
| 9 | 1 part of A 1 part of tetrazole 2 | 13 | 63 |
| 10 | 1 part of dioctyltin maleate 1 part of tetrazole 2 | 16 | 46 |
| 11 | 1 part of antimony tris-[thioglycollate] 1 part of tetrazole 2 | 12 | 91 |

TABLE 4b

| Example | Stabilizer system | ΔE before exposure | ΔE after exposure for 168 hours |
|---|---|---|---|
| 12 | 2 parts of D 1 part of tetrazole 2 | 22 | 24 |

(II) Use in a white-pigmented formulation

| Formulation: | |
|---|---|
| Unmodified S-PVC (polyvinyl chloride: K-value 65) | 100 parts |
| ®Paraloid KM 334 B | 5 parts |
| ®Paraloid K 120 N | 1.4 parts |
| ®Paraloid K 175 | 0.6 parts |
| Calcium stearate | 1.5 parts |
| ®Irgawax 367 (lubricant) | 1.0 parts |
| Titanium dioxide | 6.0 parts |

Stabilizer system is shown in Table 5
(® Paraloid KM 334 B, ® Paraloid K 120 N and ® Paraloid K 175 are conventional processing aids for polyvinyl chloride.)

TABLE 5

| Example | Stabilizer system | YI before exposure | YI after exposure for 840 hours |
|---|---|---|---|
| 13 | 1.5 parts of A 0.5 parts of tetrazole 2 | 6.7 | 44 |

What is claimed is:

1. A chlorine-containing polymer containing an amount, sufficient for stabilization against the harmful effects of light and/or heat, of (a) at least one compound of formula I

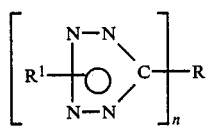

(I)

in which $R^1$ is hydrogen, $C_1$–$C_4$-alkyl, $C_5$–$C_6$-cycloalkyl, phenyl or phenyl which is substituted by $C_1$–$C_4$-alkyl or halogen, n is 1 or 2 and, if n is 1, R is $C_1$–$C_{20}$-alkyl, $C_1$–$C_{20}$-alkyl which is substituted by —OH or —SH, $C_2$–$C_{20}$-alkyl which is interrupted by

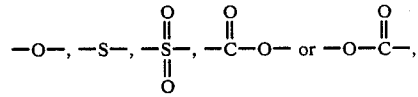

phenyl, phenyl which is substituted by $C_1$–$C_4$alkyl, benzyl, benzyl which is substituted by $C_1$–$C_4$-alkyl, $C_5$–$C_6$-cycloalkyl or —$NR^2R^3$ in which $R^2$ and $R^3$ are identical or different and are as defined for $R^1$, and, if n is 2, R is a direct bond, $C_1$–$C_{10}$-alkylene, $C_1$–$C_{10}$-alkylene which is substituted by phenyl, benzyl, —OH, $C_1$–$C_4$-alkoxy, $C_1$–$C_{20}$-acyloxy, phenyl-sulfonyl or $C_1$–$C_4$-alkylsulfonyl or $C_2$–$C_{10}$-alkylene which is interrupted by

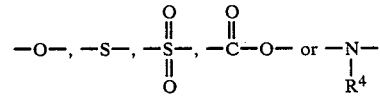

in which $R^4$ is hydrogen, $C_1$–$C_4$-alkyl, phenyl, benzyl, naphthyl, cyclohexyl or $C_1$–$C_{20}$-acyl, or R is also $C_2$–$C_{10}$-alkylidene, phenylene, benzylene or xylylene, and (b) at least one organotin compound of the formulae IIa and IIb, IIc, IId, IIe, IIf, or IIg

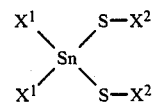

(IIa)

-continued

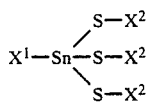 (IIb)

in which $X^1$ is $C_6$-$C_{20}$-alkoxycarbonylalkyl or $C_1$-$C_{20}$-alkyl, and $X^2$ is $C_6$-$C_{20}$-alkoxycarbonylalkyl, $C_6$-$C_{20}$-alkylcarbonyloxyalkyl or $C_4$-$C_{18}$-alkyl,

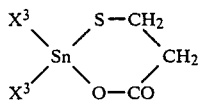 (IIc)

in which $X^3$ is $C_1$-$C_{20}$-alkyl,

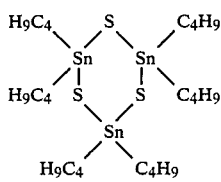 (IId)

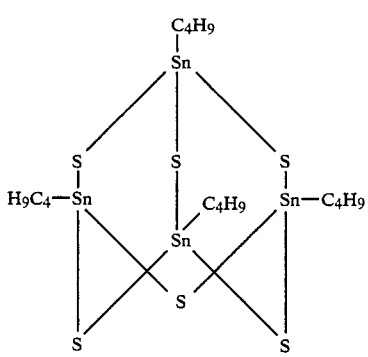 (IIe)

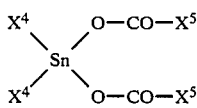 (IIf)

in which $X^4$ and $X^5$ are $C_1$-$C_{20}$-alkyl and $X^5$ is additionally ($C_1$-$C_{20}$-alkyl)—O—CO—CH=CH—, or

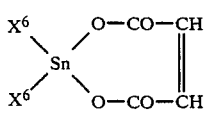 (IIg)

in which $X^6$ is $C_1$-$C_{20}$-alkyl; and/or at least one lead compound of the formulae:
3 PbO.PbSO$_4$.H$_2$O, 2 PbO.PbHPO$_3$.½H$_2$O, 2 PbO.Pb(OOC)$_2$C$_6$H$_4$, 2 PbO.Pb(OOCC$_{17}$H$_{35}$)$_2$, Pb(OOCC$_{17}$H$_{35}$)$_2$, or 2 PbO.PbCO$_3$.

2. A chlorine-containing polymer according to claim 1, in which, in the event that n=1, R is $C_1$-$C_{12}$-alkyl, $C_2$-$C_{12}$-alkyl which is interrupted by —O—, —S— or

or $C_1$-$C_{12}$-alkyl which is substituted by —OH or —SH, phenyl, benzyl or —NR$^2$R$^3$ in which R$^2$ and R$^3$ independently of one another are hydrogen or $C_1$-$C_4$alkyl, and, in the event that n=2, R is $C_1$-$C_6$-alkylene, $C_2$-$C_6$-alkylene which is interrupted by —O—, —S— or —N(R$^4$)— or $C_1$-$C_6$-alkylene which is substituted by —OH, phenylene, benzylene or xylylene.

3. A chlorine-containing polymer according to claim 1, in which R$^1$ is hydrogen, $C_1$-$C_4$-alkyl or phenyl.

4. A chlorine-containing polymer according to claim 3, in which R$^1$ is hydrogen.

5. A chlorine-containing polymer according to claim 1, in which n is 1 and R is $C_1$-$C_6$-alkyl or $C_1$-$C_6$-alkyl which is substituted by —OH, or R is —NR$^2$R$^3$ in which R$^2$ and R$^3$ independently of one another are hydrogen or $C_1$-$C_4$-alkyl.

6. A chlorine-containing polymer according to claim 5, in which n is 1 and R is —NH$_2$.

7. A chlorine-containing polymer according to claim 1, in which n is 2 and R is $C_1$-$C_6$-alkylene, $C_2$-$C_6$-alkylene which is interrupted by —S—, —O— or phenylimino, or $C_1$-$C_6$-alkylene which is substituted by —OH.

8. A chlorine-containing polymer according to claim 1, in which n is 2 and R is $C_1$-$C_6$-alkylene or $C_2$-$C_6$-alkylene which is interrupted by —S—.

9. A chlorine-containing polymer according to claim 1, in which n is 2.

10. A chlorine-containing polymer according to claim 1, containing at least one compound of the formula

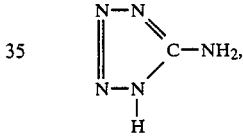

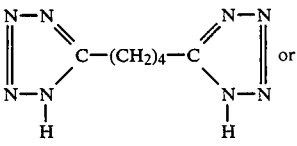 or

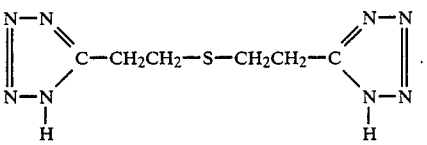

11. A chlorine-containing polymer according to claim 1, containing (a) at least one compound of the formula I and (b) at least one organotin compound.

12. A chlorine-containing polymer according to claim 1, wherein the chlorine-containing polymer is polyvinyl chloride.

13. A process for stabilizing a chlorine-containing polymer against the harmful effects of light and/or heat, which comprises incorporating into the chlorine-containing polymer an amount, adequate for stabilization of (a) at least one compound of the formula I according to claim 1 and (b) at least one organotin compound and/or lead compound according to claim 1.

* * * * *